(12) United States Patent
Ahn

(10) Patent No.: US 7,299,078 B2
(45) Date of Patent: Nov. 20, 2007

(54) MOBILE TERMINAL

(75) Inventor: Byung Jin Ahn, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 10/836,334

(22) Filed: May 3, 2004

(65) Prior Publication Data

US 2004/0224731 A1 Nov. 11, 2004

(51) Int. Cl.
*H04M 1/00* (2006.01)

(52) U.S. Cl. .............. 455/575.4; 455/550.1; 455/575.1; 455/575.3; 455/90.3; D14/240; D14/248; D14/140

(58) Field of Classification Search ........... 455/149, 455/575.4, 569.1, 550.1, 575.3, 575.1, 575.2, 455/350, 90.3, 3.08, 3.06; 381/300, 307, 381/309, 311; D14/138, 140, 240, 248
See application file for complete search history.

(56) References Cited

U.S. PATENT DOCUMENTS

| | | | | |
|---|---|---|---|---|
| 4,388,492 A | * | 6/1983 | Sato | ............................ 381/304 |
| 5,150,031 A | | 9/1992 | James et al. | |
| 5,787,361 A | * | 7/1998 | Chen | ....................... 455/575.1 |
| 6,377,827 B1 | * | 4/2002 | Rydbeck | ................... 455/575.3 |
| 7,103,393 B2 | * | 9/2006 | Hwang | ..................... 455/569.1 |
| 2004/0048638 A1 | * | 3/2004 | Inomata et al. | ............. 455/572 |
| 2004/0204194 A1 | * | 10/2004 | Akai et al. | ............... 455/575.1 |

FOREIGN PATENT DOCUMENTS

| | | |
|---|---|---|
| CN | 1469618 | 1/2004 |
| KR | 1020020078921 | 10/2002 |

OTHER PUBLICATIONS

Chinese Office Action.
Chinese Office Action dated Jul. 21, 2006.

* cited by examiner

*Primary Examiner*—Temica Beamer
*Assistant Examiner*—Olumide Ajibade-Akonai
(74) *Attorney, Agent, or Firm*—Ked & Associates, LLP

(57) ABSTRACT

A mobile terminal includes a speaker arrangement for providing surround sound. The terminal includes a folder hinged at a main body and having an LCD attached thereto, speakers mounted at the folder and implementing a three-dimensional surround-sound effect, and a sliding unit for sliding at least one of the speakers when the speakers produce the three-dimensional surround-sound effect. Because the distance between the speakers can be widened according to a user's selection, three-dimensional surround-sound can be maximized and thus product quality can be significantly enhanced.

52 Claims, 7 Drawing Sheets

MOBILE TERMINAL

BACKGROUND OF THE INVENTION

1. Field of the Invention

The present invention generally relates to a mobile terminal, and more particularly to a mobile terminal implementing surround-sound through installation of a plurality of speakers at the terminal.

2. Description of the Related Art

Mobile terminals have recently been developed which allow users to download music files or video clips from the Internet as well as transmit or receive voice signals and access the Internet. In fact, the functionality of mobile terminals are being extended every day.

FIGS. 1 and 2 show a related-art mobile terminal which includes a main body 110 having various circuit components installed therein, a menu button 102 and a dial button 104 provided at its front surface, a battery 106 mounted at its rear surface, and a folder 120 rotatably connected by a hinge connection unit 112 to the main body and having an inner LCD 116 for displaying user-desired information.

A microphone 122 is installed at the main body to transmit a voice signal of a user. In addition to the inner LCD 116, a receiver 126 is mounted at an inner side of the folder for transferring the voice of another party to the user. At an outer side of the folder, an outer LCD 130 is attached and two speakers 124 for implementing three-dimensional surround-sound are installed with a certain spacing interval therebetween.

When the related-art mobile terminal downloads a music file or video clip and executes it, three-dimensional surround-sound is implemented through the two speakers 124. However, since the two speakers are fixed within folder 120, the spacing distance between the two speakers significantly limited. That is, because the amount by which the width of the folder can be increased is limited, it is difficult to space the two speakers a significant distance apart. This causes a problem in that the user can not feel the three-dimensional surround-sound effect. Also, with the related-art arrangement, even if the spacing can be increased, the surround-sound effect can be hardly perceived, by the user with the two speakers.

SUMMARY OF THE INVENTION

An object of the present invention is to solve one or more problems of the related-art and/or to achieve at least one of the following advantages.

Another object of the present invention is to provide a mobile terminal with enhanced product value by slidably installing speakers at a folder, to thereby widen the distance between the speakers and thus to maximize the three-dimensional surround-sound effect.

To achieve these and other objects and advantages, the present invention provides a mobile terminal which according to one preferred embodiment includes: a folder hinged at a main body and an LCD attached thereto, a plurality of speakers (at least two) mounted at the folder for implementing three-dimensional surround-sound, and a sliding unit for slidably extending a position of at least one of the speakers relative to the folder when the speakers produce the three-dimensional surround-sound effect.

The speakers are slidably mounted on a mounting part formed at an inner surface of the folder. The following features are provided on the surface of the mounting part: a first connection terminal electrically connected to the speaker when the speaker is in a state of having been received in the folder, and a second connection terminal electrically connected to the speaker when the speaker is in a state of having been moved in a width direction of the folder. The speakers are preferably disposed to face the mounting part, and at least one of the speakers slides in a predetermined (e.g., width) direction of the folder.

The speaker includes a speaker case slidably disposed at the mounting part formed at the folder; a sound generator installed in the speaker case and generating a sound; and a speaker terminal formed at a lower surface of the speaker case and electrically connected one of the first connection terminal and the second connection terminal.

The sliding unit includes: a guide rail formed in a width direction of the folder at the mounting part of the folder; and a guide groove formed at a lower surface of the speaker case and slidably inserted into the guide rail.

A stopper is formed between the speaker case and the mounting part in order to prevent the speaker from releasing from the folder when the speaker is slidably moved.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
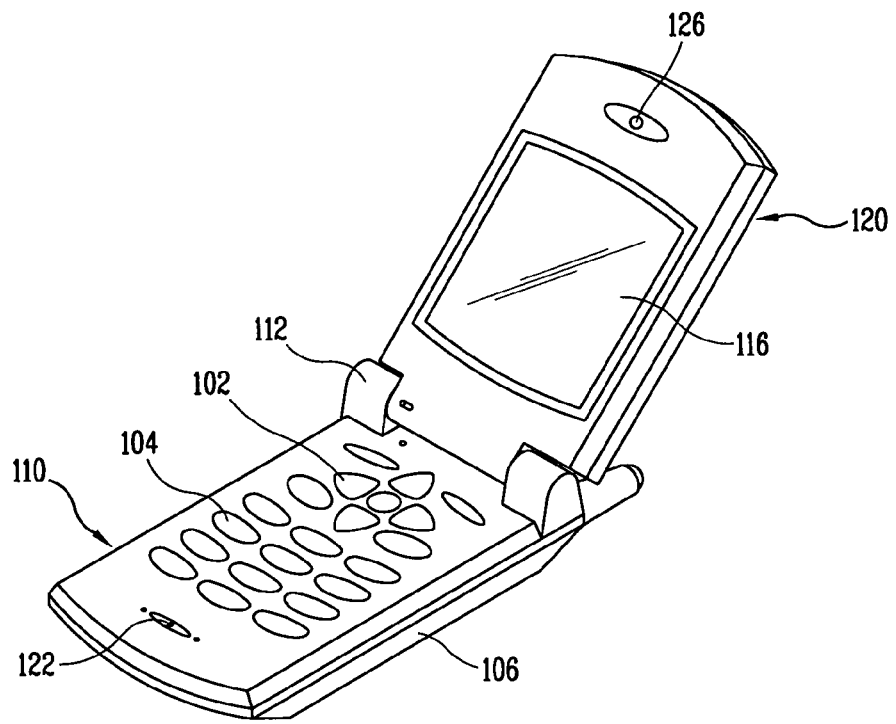
FIG. 1 is a perspective view of a related-art mobile terminal.
Figure 2:
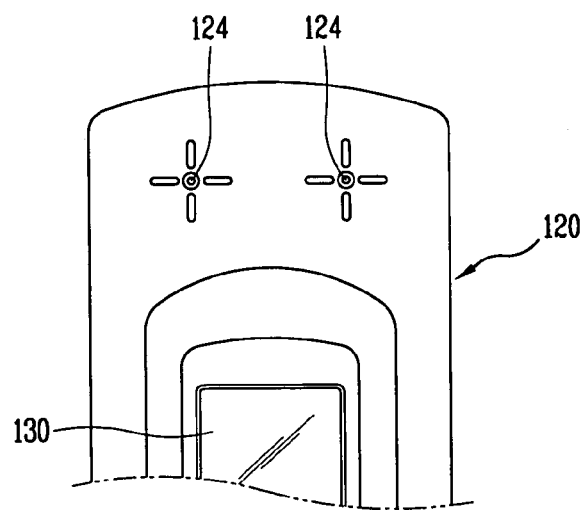
FIG. 2 is a front view of a folder of the mobile terminal in FIG. 1.
Figure 3:
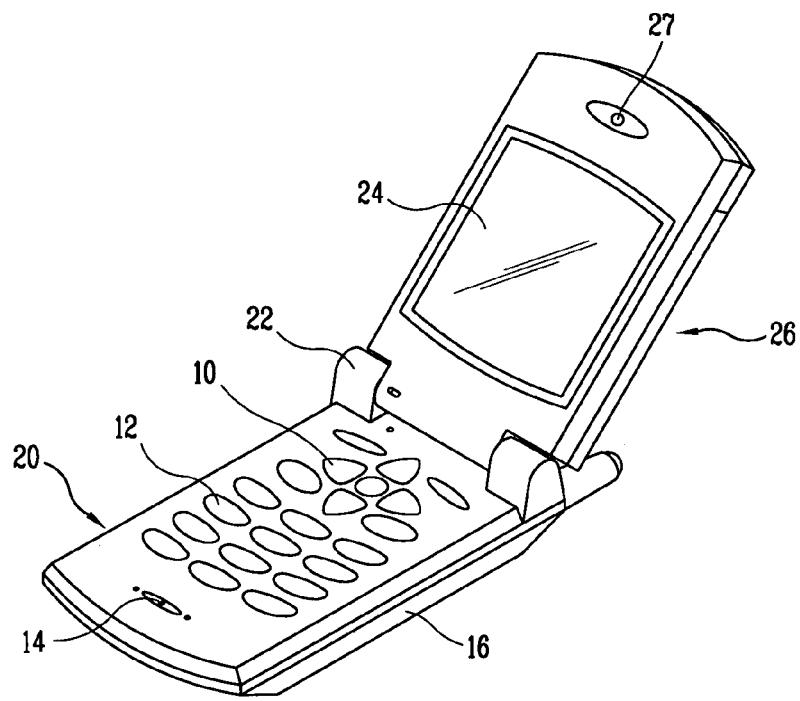
FIG. 3 is a perspective view of a mobile terminal in accordance with one embodiment of the present invention.
Figure 4:
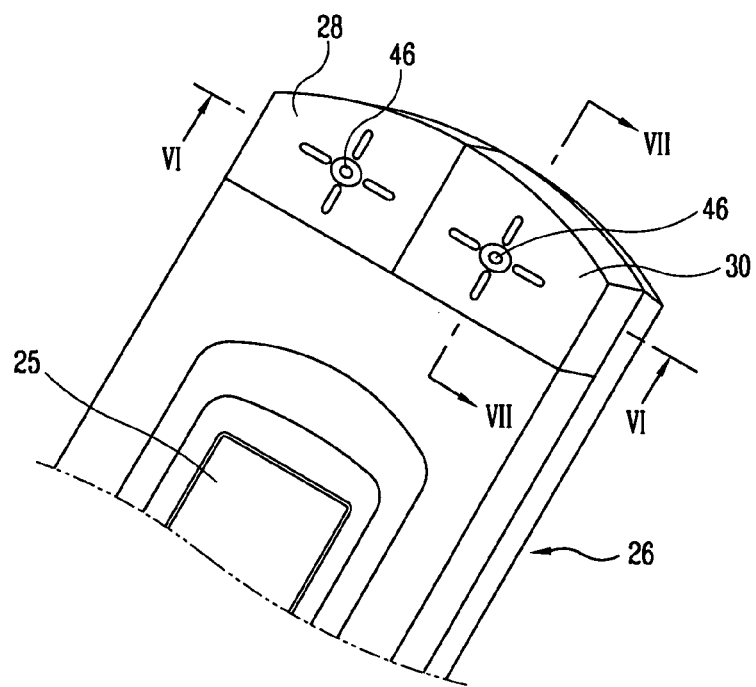
FIG. 4 is a partial perspective view of a folder with speakers mounted in the mobile terminal of the present invention.

FIG. 3 shows a mobile terminal in accordance with one embodiment of the present invention, and FIG. 4 shows a partial perspective view of the folder with speakers mounted of the mobile terminal in accordance with the present invention. The mobile terminal of the present invention includes a main body 20, a folder 26, an LCD 24, speakers 28 and 30, and a sliding unit. The main body includes a printed circuit board having various circuit components mounted thereon. The folder is rotatably connected by hinge connection unit 22 to the main body, and the LCD is included on an inner surface of the folder for displaying user-desired and other information. The two speakers are mounted on an outer surface of the folder and accomplish a three-dimensional surround-sound effect. And, the sliding unit is provided for sliding at least one of the speakers in order to widen the spacing between the speakers when the speakers are intended to accomplish the three-dimensional surround-sound effect. While for illustrative purposes two speakers are shown, any number of speakers more than two may be mounted in the folder if desired. Also, if desired, all or a portion of the speakers may be mounted at other locations in the terminal, including but not limited to the inner surface of the folder on the main body. In these alternative arrangements, the sliding unit may be disposed to slide one or more of the speakers relative to one another.

A front surface of the main body preferably includes a menu button 10, a dial button 12, and a microphone 14 for transmitting a voice signal of a user. A battery 16 may be mounted at a rear surface of the main body for powering the terminal.

Figure 5:
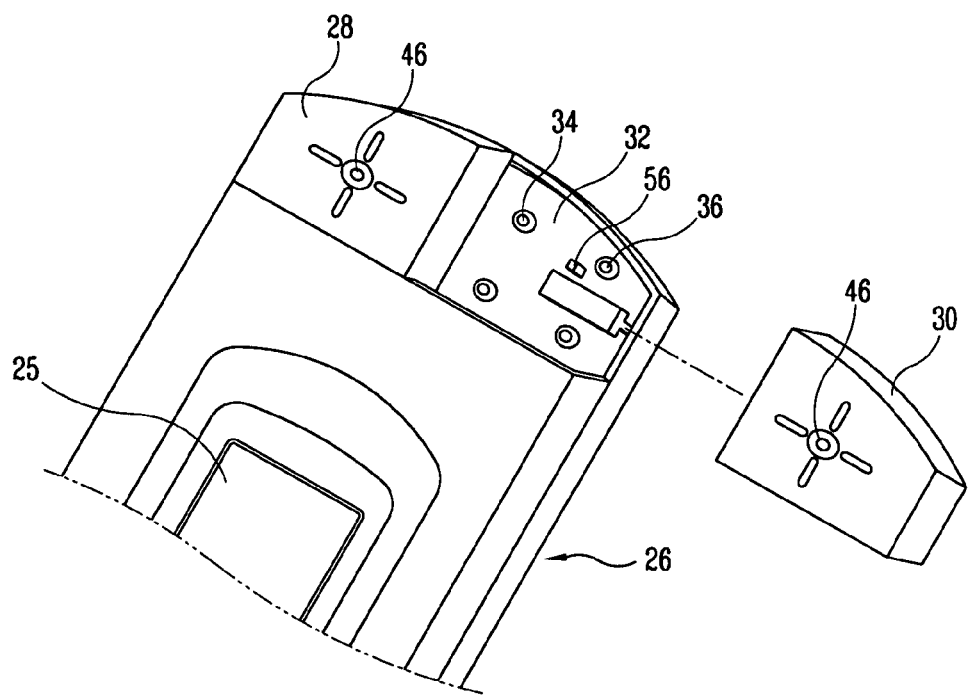
FIG. 5 is an exploded perspective view showing the folder and speakers of the mobile terminal of the present invention.

The inner side of the folder preferably includes the inner LCD 24 and a receiver 27 for transferring a voice of another party to the user, and an outer side of the folder may include an outer LCD 25 and a mounting part 32 on which the speakers 28 and 30 are mounted (FIG. 5). The mounting part 32 is preferably lower than the folder 26, and when the speakers are mounted on the mounting part the inner surface of the folder may be at the same level.

A first connection terminal 34 and a second connection terminal 36 are formed at the inner surface of the mounting part 32. When the speakers 28 and 30 are in retracted position in the folder, the first connection terminal 34 is electrically connected to the speakers. When the speakers are in an outwardly slid state from the folder, the second connection terminal 26 is electrically connected to the speakers.

Figure 6:
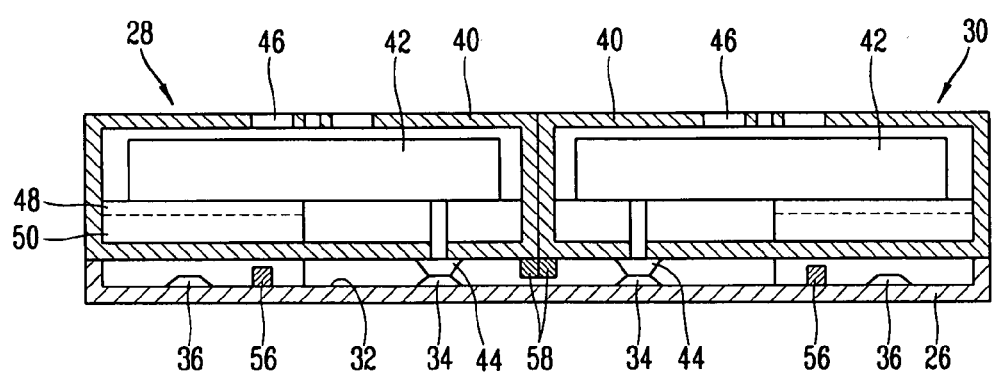
FIG. 6 is a sectional view of a portion of the mobile terminal containing the speakers taken along line VI-VI of FIG. 4.

With reference to FIG. 6, the two speakers 28 and 30 respectively include, a speaker case 40 slidably installed at the mounting part formed at the folder, a sound generator 42 installed in the speaker case for generating surround-sound, and a speaker terminal 44 connected to the sound generator. The speaker terminal 44 protrudes from the rear surface of the speaker case 40 so as to be in contact with one of the first connection terminal 34 and the second connection terminal 36.

One or more sound discharge holes 46 are formed at a front surface of the speaker case 40 to discharge outwardly a sound generated from the sound generator 42. The speaker terminals 44 and the first and second connection terminals 34 and 35 protruding from the surface of the mounting part 32 are preferably but not necessarily formed to be round at their end portions, so that they can easily establish contact with each other.

Figure 7:
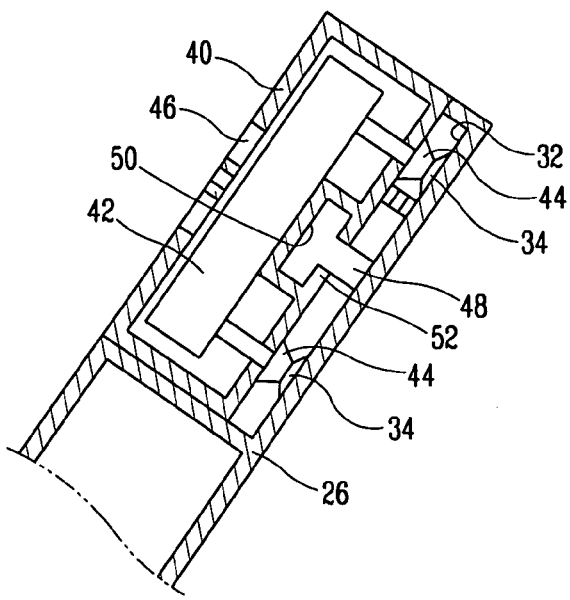
FIG. 7 is a sectional view of a portion of the mobile terminal containing the speakers taken along line VII-VII of FIG. 4.
Figure 8:
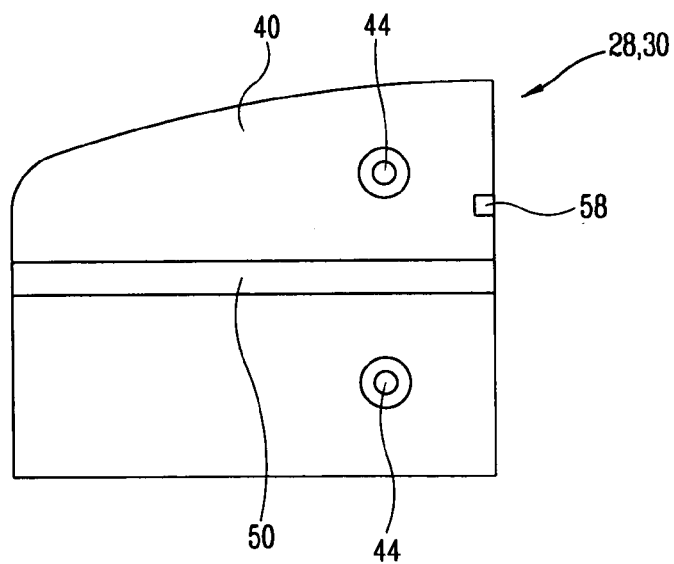
FIG. 8 is a bottom view of the speakers in accordance with the present invention.

With reference to FIGS. 7 and 8, the sliding unit includes a guide rail 48 formed long in a width direction of the folder 26 on the mounting part 32 of the folder, and a guide groove 50 formed at a lower surface of the speaker case 40 and insertedly coupled to the guide rail 48 to allow sliding movement.

The guide rail 48 may be formed in a 'T' shape in its section although other shapes may be used, and a release preventing jaw 52 is preferably formed at the guide groove 50 to prevent the speakers from releasing from the folder.

Each speaker unit may also include a stopper arrangement formed between the speaker case 40 and mounting part 32. The stopper arrangements are provided to prevent the speakers 28 and 30 from releasing from the folder 26 after sliding for more than a predetermined distance. Each of the stopper arrangements includes a first stopper 56 protruding from the surface of the mounting part 32 and a second stopper 58 protruding from a lower surface of the speaker case 40, which is caught by the first stopper when the speakers slide as long as the predetermined distance. While these stopper arrangements are preferable, other stopper arrangements may alternatively be used. Operation of the aforementioned embodiment of the mobile terminal will now be explained.

Figure 9:
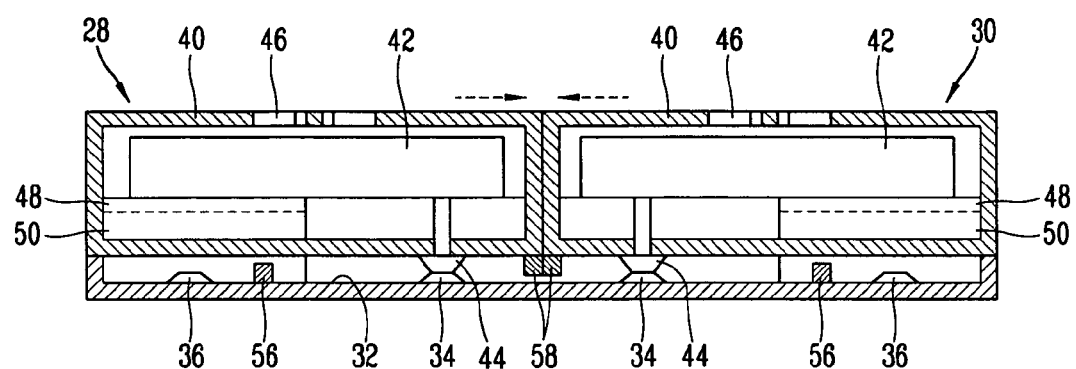
FIGS. 9 and 10 show different operational states of the mobile terminal of the present invention.
Figure 10:
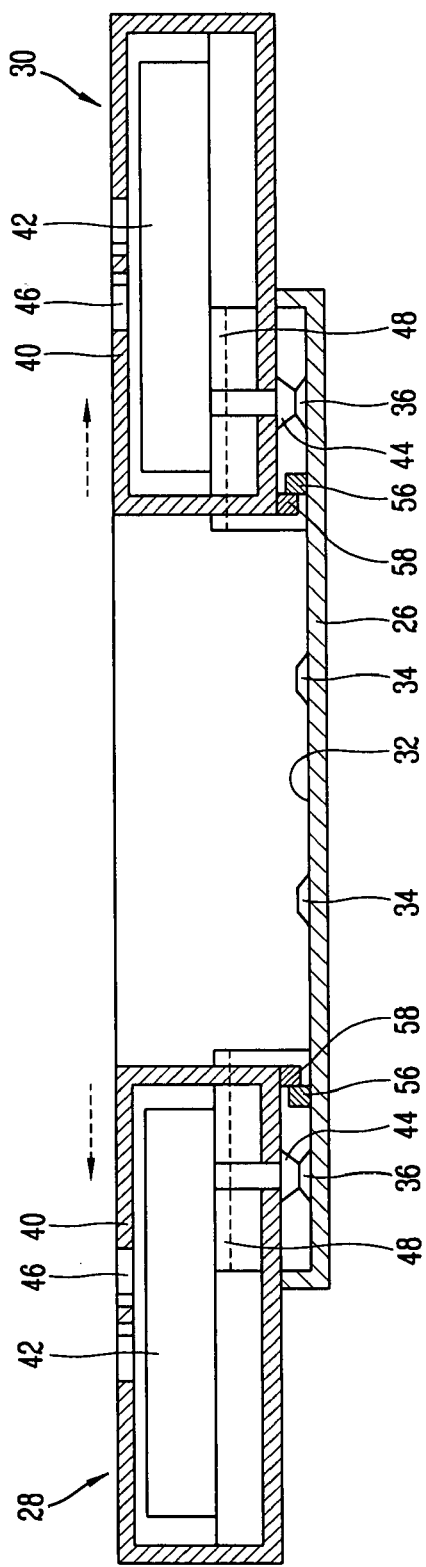

FIGS. 9 and 10 show different operational states of the mobile terminal. As shown in FIG. 9, if the mobile terminal is used for a voice transmission and reception or for purposes other than the three-dimensional surround-sound, the speakers 28 and 30 are disposed in a retracted position, e.g., in contact with each other, on mounting part 32 of the folder. In this case, speaker terminal 44 formed at the lower surface of the speaker case 40 contacts the first connection terminal 34 in order to input an electric signal into the speakers.

Also shown in FIG. 10, if a user desires to implement three-dimensional surround-sound, the user may take and pull the speaker case 40 in the width direction of the folder. As a result of these pulling forces, the speaker case 40 slides outwardly from the folder along guide rail 48 formed at the mounting part, thereby widening the space between the speakers. In this extended position, the speakers are prevented from falling out of the folder as a result of the first stopper 56 formed at the mounting part contacting the second speaker 58 formed at the speaker case 40. In this position, speaker terminal 44 contacts the second connection terminal 36 formed at the mounting part 32. If desired, the sliding unit may be configured so that only one of the speakers slides relative to one or more other speakers, which, for example, may be placed at a fixed position in the folder.

Figure 11:
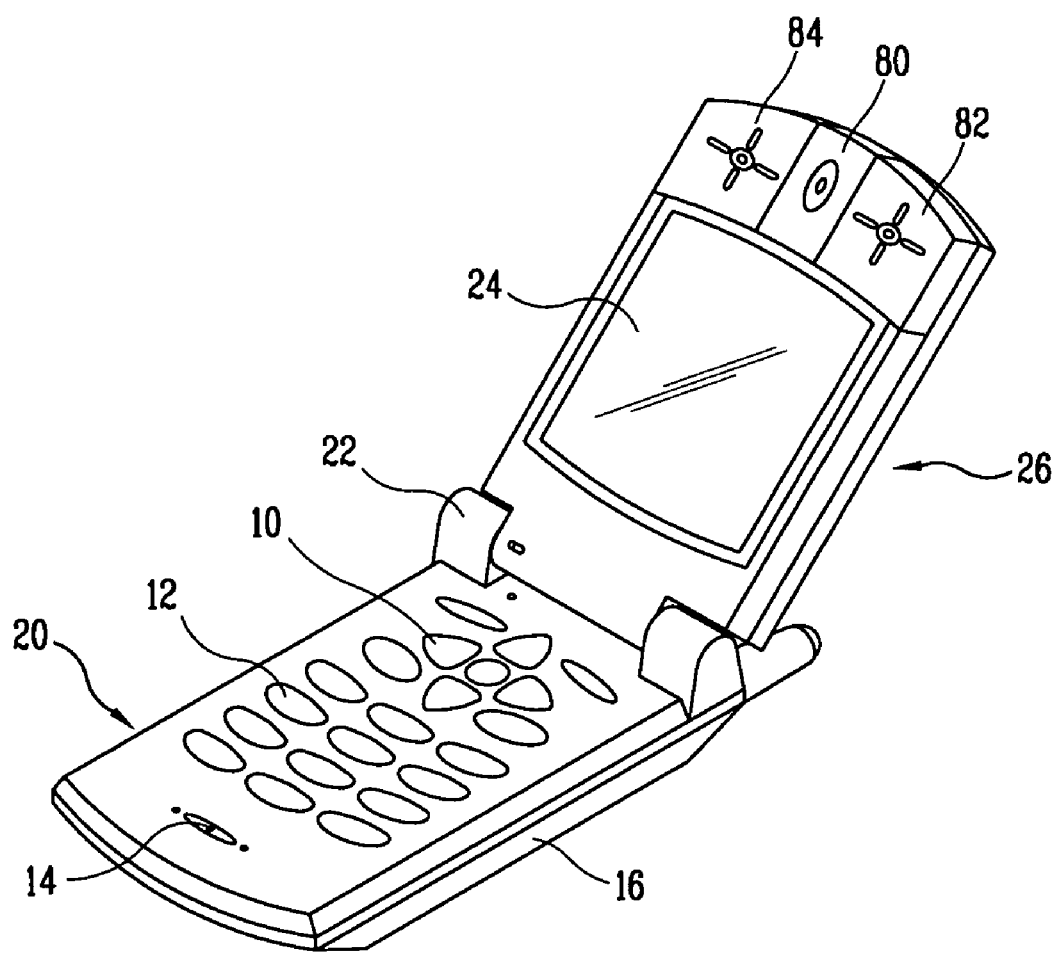
FIG. 11 is a perspective view of a mobile terminal in accordance with another embodiment of the present invention.

FIG. 11 is a perspective view of a mobile terminal in accordance with another embodiment of the present invention. In this embodiment, the speakers are preferably installed at an inner side of the folder. That is, a receiver 80 for receiving a voice from another party is installed at a center of the inner side of the folder 26, and plurality of speakers (e.g., two) 82 and 84 are installed to be movable in a width direction of the folder at respective sides of the receiver. A sliding unit for moving the speakers may be the same as the sliding unit of the former embodiment.

In the mobile terminal, a voice of the other party is received through the receiver 80 mounted at an inner side of the folder, and three-dimensional surround-sound is implemented by moving the speakers apart from one another in the width direction to widen the space between the speakers.

As so far described, the mobile terminal of the present invention has the following advantages. For example, in implementing three-dimensional surround-sound at least one of a plurality of speakers slides in a width direction of the folder to widen the space between the speakers. As a result, three-dimensional surround-sound effect can be maximized and thus performance of the mobile terminal can be enhanced.

The present invention may be embodied in several forms without departing from the spirit or essential characteristics thereof. It should also be understood that the above-described embodiments are not limited by any details of the foregoing description, unless otherwise specified, but rather should be construed broadly within its spirit and scope, and therefore all changes and modifications that fall within the metes and bounds of the claims, or equivalence of such metes and bounds are therefore intended to be embraced by the appended claims.

What is claimed is:

1. A mobile communication terminal comprising:
   a main body;
   a folder pivotally connected to the main body;
   a plurality of speakers mounted on a same surface of the folder; and
   a sliding unit which slides at least a first one of the speakers along an axis passing through at least a second one of the speakers.

2. The mobile communication terminal of claim 1, further comprising:
   a receiver mounted at an inner side of the folder; and
   a mounting part coupled to the sliding unit and formed at an outer side of the folder.

3. The mobile communication terminal of claim 2, further comprising:
   a first connection terminal coupled to the mounting part and electrically connected to the first speaker when the speaker is in an unextended position in the folder; and
   a second connection terminal electrically connected to the first speaker when the first speaker is moved to an extended position by the sliding unit relative to the folder.

4. The mobile communication terminal of claim 2, wherein the speakers are disposed to face the mounting part, and at least the first speaker slides in a width direction of the folder.

5. The mobile communication terminal of claim 3, wherein at least the first speaker comprises:
   a speaker case slidably disposed at the mounting part formed at the folder;
   a sound generator installed in the speaker case for generating sound; and
   a speaker terminal formed at a lower surface of the speaker case and electrically connected one of the first connection terminal and the second connection terminal.

6. The mobile communication terminal of claim 5, wherein the speaker case has a sound discharge hole for discharging a sound generated from the sound generator at an upper surface and a speaker terminal protruded from a lower surface.

7. The mobile communication terminal of claim 5, wherein the sliding unit comprises:
   a guide rail formed in a width direction of the folder at the mounting part of the folder; and
   a guide groove formed at a lower surface of the speaker case and slidably inserted into the guide rail.

8. The mobile communication terminal of claim 7, wherein the guide rail has a sectional "T" shape, and a release preventing jaw is located at the guide groove.

9. The mobile communication terminal of claim 2, wherein a stopper is formed between the speaker case and the mounting part in order to prevent the first speaker from releasing from the folder when the first speaker is moved by the sliding unit.

10. The mobile communication terminal of claim 9, wherein the stopper comprises:
    a first stopper protruding from a surface of the mounting part; and
    a second stopper protruding from a lower surface of the speaker case and being caught by the first stopper when the first speaker slides to a predetermined distance relative to at least one of the other speakers.

11. The mobile communication terminal of claim 1, further comprising:
    a receiver for receiving a voice signal and installed at an inner side of the folder,
    wherein the first and second speakers are slidably mounted on respective sides of the receiver.

12. The mobile communication terminal of claim 1, wherein the sliding unit slides the first speaker and the second speaker along said axis.

13. The mobile communication terminal of claim 12, wherein the sliding unit allows the first and second speakers to slide apart along said axis in opposing directions.

14. The mobile communication terminal of claim 13, wherein the first and second speakers are mounted on a same side of the terminal.

15. The mobile communication terminal of claim 1, wherein the second speaker is in a fixed position.

16. The mobile communication terminal of claim 1, further comprising: a display coupled to the folder.

17. The mobile communication terminal of claim 1, wherein the speakers are mounted on an inner surface of the folder.

18. The mobile communication terminal of claim 1, wherein the speakers are mounted an outer surface of the folder.

19. The mobile communication terminal of claim 1, further comprising: a receiver between the first speaker and a second speaker.

20. The mobile communication terminal of claim 1, wherein the sliding unit slides the first and second speakers slide along said axis.

21. The mobile communication terminal of claim 20, wherein the sliding unit allows the first and second speakers to slide independently along said axis.

22. The mobile communication terminal of claim 20, wherein the first and second speakers slide along a same side of the folder.

23. The mobile communication terminal of claim 22, wherein the first and second speakers slide to project from different sides of the folder.

24. The mobile communication terminal of claim 23, wherein the first and second speakers project in directions perpendicular to said different sides.

25. The mobile communication terminal of claim 1, wherein the first and second speakers contact one another when in a retracted position and are spaced apart when the sliding unit slides at least the first speaker.

26. The mobile communication terminal of claim 1, wherein the first and second speakers are at substantially a same level with a surface of the folder in a retracted position and are at different levels with said surface in an extended position.

27. A mobile communication terminal, comprising:
    a housing portion;
    first and second speakers mounted on a same surface of the housing portion; and
    an adjuster which adjusts a position of at least one of the first and second speakers along said surface, the adjuster allowing at least the first speaker to move along an axis passing through the second speaker.

28. The mobile communication terminal of claim 27, wherein the adjuster allows the first speaker to move relative to the second speaker along said axis in a first direction.

29. The mobile communication terminal of claim 28, wherein the first direction is a direction parallel to the same surface of the housing portion.

30. The mobile communication terminal of claim 28, wherein the second speaker is in a fixed position.

31. The mobile communication terminal of claim 28, wherein the adjuster allows both of the first and second speakers to move apart along said axis, the first speaker moving in said first direction and the second speaker moving in a second direction opposite to the first direction along said axis.

32. The mobile communication terminal of claim 28, further comprising: a receiver between the first ad second speakers.

33. The mobile communication terminal of claim 27, wherein the adjuster includes: a sliding unit which allows at least the first speaker to slide along said axis which passes through the first and second speakers.

34. The mobile communication terminal of claim 33, wherein the sliding unit allows at least the first speaker to slide along a rail in a mounting part of the terminal.

35. The mobile communication terminal of claim 33, wherein the sliding unit allows both of the first and second speakers along said axis.

36. The mobile communication terminal of claim 33, further comprising:
  a first electrode electrically connected to a circuit in the terminal,
  a second electrode electrically connected to the circuit in the terminal; and
  a third electrode electrically connected to the first speaker, wherein the third electrode contacts the first electrode when the adjuster allows the first speaker to move to a retracted position and contacts the second electrode when the adjuster allows the first speaker to move to an extended position.

37. The mobile communication terminal of claim 36, further comprising: at least one stopper which prevents the first speaker from moving past the extended position.

38. The mobile communication terminal of claim 27, wherein the adjuster allows at least the first speaker to move along said axis to a position that produces a surround-sound effect.

39. The mobile communication terminal of claim 27, wherein at least one of the first and second speakers are moved by the adjuster along said axis to project from a side of the terminal.

40. The mobile communication terminal of claim 39, wherein at least one of the first and second speakers move in a direction perpendicular to said side.

41. The mobile communication terminal of claim 27, further comprising:
  another housing portion movably connected to the housing portion,
  wherein the plurality of speakers are mounted on a same surface of one of the housing portion or said another housing portion and wherein the adjuster allows at least the first speaker to move on said same surface along said axis passing through the second speaker.

42. The mobile communications terminal of claim 41, wherein the second housing portion is pivotally coupled to the first housing portion.

43. A mobile communication terminal, comprising:
  first and second speakers; and
  an adjuster which allows the first and second speakers to move in opposing directions along a same surface of the housing portion, the adjuster allowing the first and second speakers to move along an axis passing through both the first and second speakers.

44. The mobile communication terminal of claim 43, wherein the adjuster allows the first and second speakers to move independently along said same surface.

45. The mobile communication terminal of claim 43, further comprising:
  a main body; and
  a folder coupled to the main body, wherein the first and second speakers slide along said axis to project from different sides of the folder.

46. The mobile communication terminal of claim 45, wherein the first and second speakers project in directions perpendicular to said different sides.

47. The mobile communication terminal of claim 43, further comprising:
  first connection terminals electrically coupled to the first and second speakers,
  respectively, when the first and second speakers are in retracted positions; and
  second connection terminals electrically coupled to the first and second speakers, respectively, when the first and second speakers move along said axis to extended positions, the first and second connection terminals delivering audio signals to the first and second speakers.

48. A mobile communication terminal, comprising:
  a housing portion;
  first and second speakers coupled to the housing portion; and
  an adjuster which allows the first and second speakers to project from different sides of the terminal, the first and second speakers moving along a same surface of the housing portion along an axis passing through the first and second speakers, the first and second speakers moving along said axis in directions perpendicular to said different sides from which the first and second speakers project.

49. The mobile communication terminal of claim 48, wherein the first and second speakers are mounted on a same side of the housing portion of the terminal.

50. The mobile communication terminal of claim 48, wherein the first and second speakers move independently from one another.

51. The mobile communication terminal of claim 48, further comprising:
  first connection terminals electrically coupled to the first and second speakers, respectively, when the first and second speakers are in retracted positions; and
  second connection terminals electrically coupled to the first and second speakers, respectively, when the first and second speakers move to extended positions, the first and second connection terminals delivering audio signals to the first and second speakers.

52. The mobile communication terminal of claim 48, further comprising:
  another housing portion movably coupled to said housing portion,
  wherein said another housing portion includes at least one of a keypad or a display of the mobile terminal.

* * * * *